Patented June 18, 1940

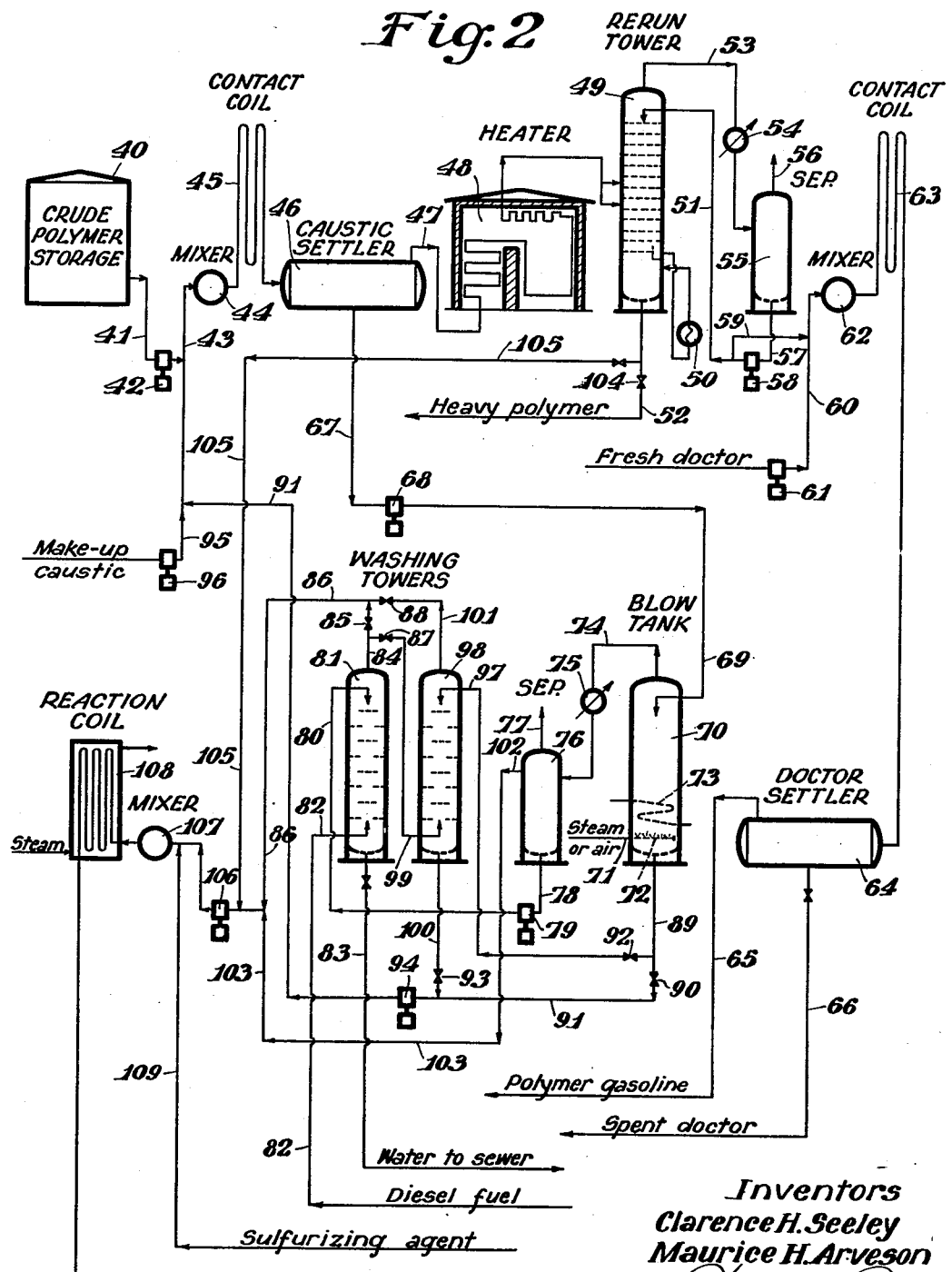

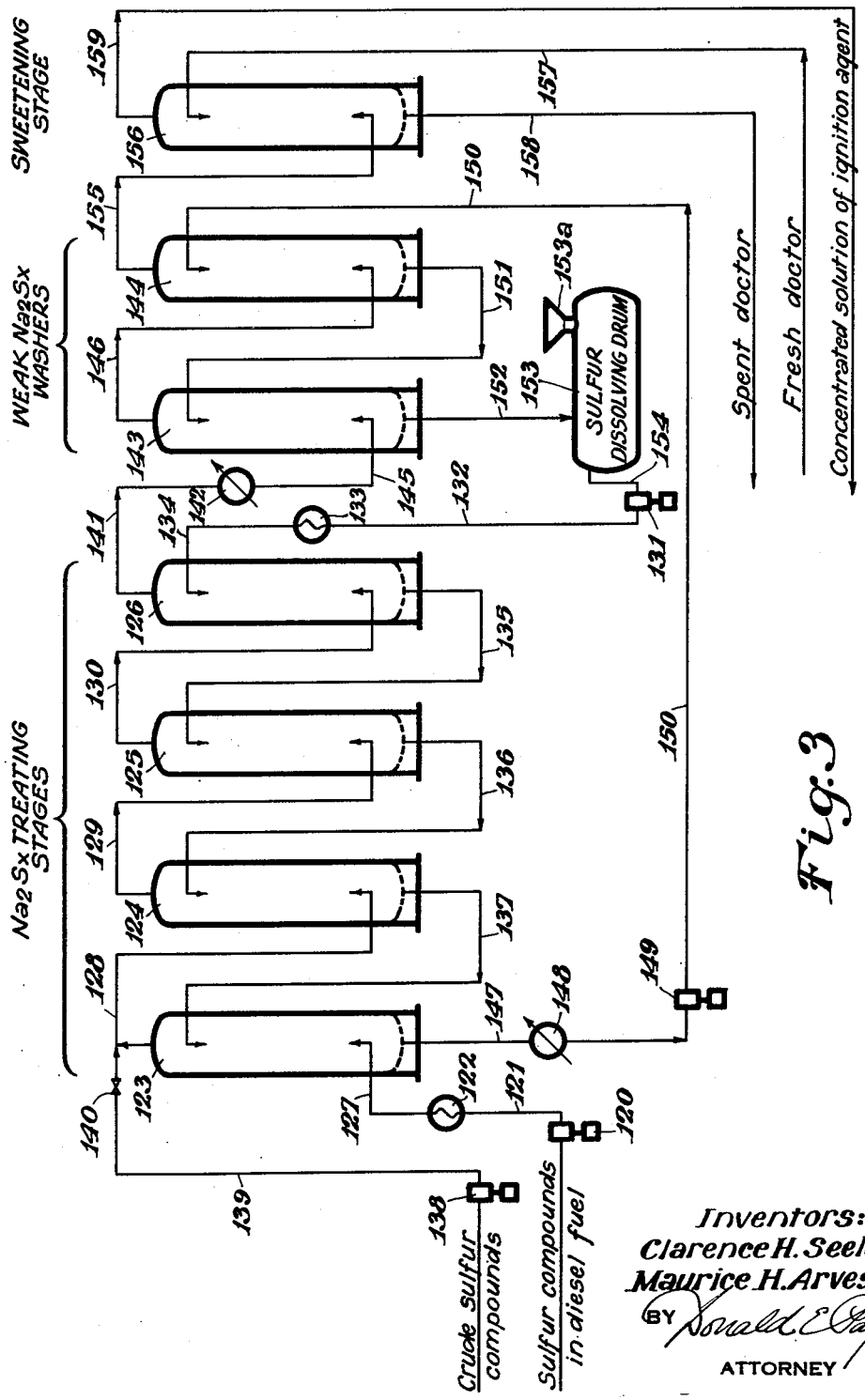

2,205,126

UNITED STATES PATENT OFFICE 2,205,126

PREPARATION OF SULPHUR-CONTAINING DIESEL FUEL IGNITION AGENTS

Clarence H. Seeley and Maurice H. Arveson, Chicago, Ill., assignors to Standard Oil Company, Chicago, Ill., a corporation of Indiana Application June 30, 1937, Serial No. 151,166

5 Claims. (Cl. 44—9)

This invention relates to the preparation of sulphur-containing Diesel fuel ignition agents. The invention relates more particularly to the manufacture of such agents from light petroleum distillates containing substantial quantities of mercaptans.

Most commercially available Diesel fuel oils, especially those made from naphthenic type crude oils or containing considerable quantities of cracked stocks, have ignition characteristics which make them poorly adapted for use in certain types of Diesel engines, particularly those of the high speed type. These engines require fuels which have a short delay period between injection into the cylinder and ignition of the oil. It has been proposed to add small quantities of various materials to Diesel fuels to reduce the delay period and accelerate ignition in the engine, but these proposed ignition accelerators are generally rather expensive pure organic compounds.

One object of this invention is to provide a method of preparing sulphur-containing Diesel fuel ignition agents which are inexpensive and yet very effective in accelerating ignition of the fuel. Another object is to prepare these ignition agents from light petroleum distillates containing substantial quantities of mercaptans. Still another object is to provide a process for obtaining sulphur-containing Diesel fuel ignition agents in concentrated form from petroleum distillate. Further objects will be apparent from the following detailed description read in conjunction with the accompanying drawings, in which:

Figure 2 shows diagrammatically an apparatus suitable for practicing a modification of the invention including the step of rerunning the petroleum distillate after washing with alkali; and Figure 3 shows diagrammatically a form of apparatus for carrying out the step of sulphurizing the recovered sulphur compounds.

Figure 1:
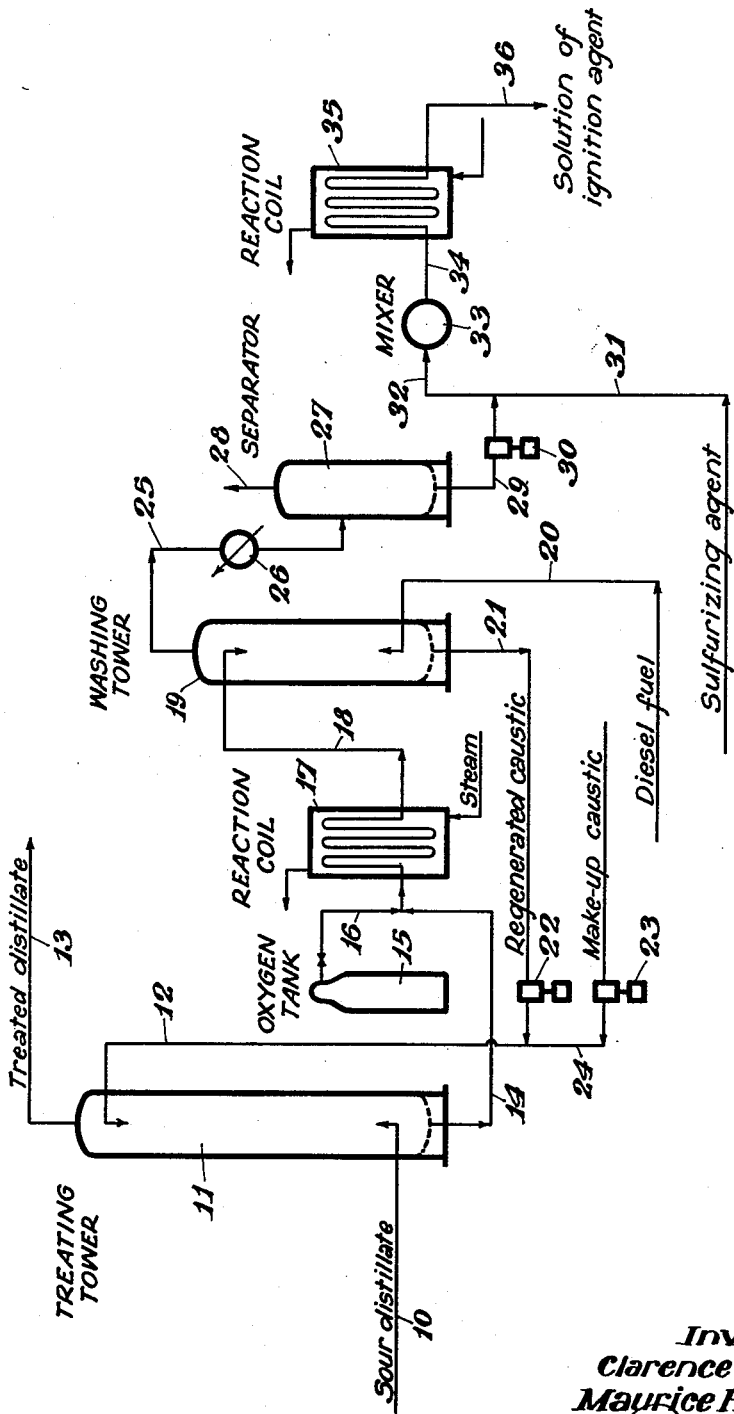
Figure 1 shows diagrammatically one form of apparatus suitable for carrying out the invention.

In carrying out the invention a petroleum fraction containing substantial quantities of mercaptans is treated with an aqueous solution of a caustic alkali such as sodium or potassium hydroxide, the spent caustic solution containing mercaptides is treated with a revivifying agent, such as air, oxygen, or steam, to revivify the same and to recover the sulphur compounds therefrom, the sulphur compounds are dissolved in a petroleum distillate such as Diesel fuel oil, and the resulting solution is sulphurized with a sulphurizing agent such as sulphur or an alkali polysulphide solution to produce a concentrated solution of the ignition agent in Diesel fuel oil. In a modification of the process the distillate after alkali treating is rerun and the unvaporized residue, which contains sulphur compounds not removed by the alkali solution, is added prior to the sulphurizing stage to the solution of sulphur compounds obtained in the revivification of the spent caustic solution.

By means of this invention a highly effective sulphur-containing Diesel fuel ignition agent is prepared at low cost from materials available in the refinery, and at the same time a petroleum fraction containing substantial quantities of mercaptans is efficiently refined while maintaining a low consumption of caustic alkali solution.

Referring now to Figure 1, a sour petroleum distillate containing substantial quantities of mercaptans is introduced by suitable means (not shown) through line 10 into the bottom of treating tower 11. This distillate, which preferably contains at least 0.1% of mercaptan sulphur, may be obtained from any source, such as the cracking or distillation of high sulphur crude oils or fractions thereof, but a particularly suitable distillate is the polymer produced by the catalytic polymerization of gases containing large amounts of hydrogen sulphide, for example 200 or more grains $H_2S$ per 100 cu. ft. Such gases may be formed in the cracking of oils high in sulphur. Suitable polymerization catalysts are phosphoric acid on kieselguhr or sodium aluminum chloride. The sour distillate is treated countercurrently in tower 11 with an aqueous solution of an alkali, such as an aqueous caustic soda solution containing for example 15–35% NaOH, which is introduced into the upper portion of tower 11 by means of line 12. The caustic solution reacts with the mercaptans in the distillate to form alkali mercaptides, which are preferentially soluble in the caustic solution. The treated distillate is removed from the tower through line 13, and may be further treated by well known means, e. g., sweetening with doctor solution, to produce finished motor fuel.

The spent caustic solution containing mercaptides is removed from the bottom of tower 11 through line 14 and mixed with oxygen, air, or oxygen-containing gas from a suitable source, which is illustrated in the drawings by oxygen tank 15, supplied through line 16. The mixture of spent caustic solution and oxygen or air is then passed through reaction coil 17, which may if desired be heated with steam or other suitable means, and introduced through line 18 into the top of washing tower 19. The oxygen or air introduced into the spent caustic reacts with the mercaptides to form disulphides and other sulphur compounds, and regenerates the caustic solution. A petroleum distillate such as Diesel fuel, is introduced into the bottom of tower 19 through line 20, and flows up the tower countercurrent to the caustic solution therein. The disulphides and other sulphur compounds, which are preferentially oil-soluble, dissolve in the Diesel fuel, and the revivified caustic solution, now free from sulphur compounds, is returned from the bottom of tower 19 to the top of tower 11 by means of line 21, pump 22, and line 12. The caustic solution in the circulating system may be maintained in sufficient quantity and at the proper concentration by adding fresh caustic solution from a suitable source (not shown) at intervals through pump 23 and line 24.

The Diesel fuel which now contains a large quantity of dissolved sulphur compounds, is removed from the top of tower 19 through line 25, passed through cooler 26 into separator 27, in which excess oxygen or other gases are separated from the Diesel fuel and removed through vent 28. The air and/or gas-freed Diesel fuel is removed from the bottom of separator 27 by means of line 29 and pump 30 and mixed with a stream of a sulphurizing agent from line 31 in line 32 and mixer 33. The sulphurizing agent for example may be elementary sulphur, a concentrated solution of sulphur in an organic solvent such as carbon disulphide, or a concentrated aqueous solution of an alkali polysulphide such as sodium, potassium, or ammonium polysulphide.

The mixture of sulphurizing agent and Diesel fuel containing sulphur compounds is then passed through line 34 to reaction coil 35, which may be heated by steam or other suitable means. In this coil a reaction takes place between the sulphurizing agent and the sulfur compounds dissolved in the Diesel fuel to produce a concentrated solution of a sulphur-containing ignition agent in Diesel fuel. The finished product is withdrawn from the system through line 36, and may be blended in small quantities with Diesel fuels to improve their ignition characteristics. If desired the solution of ignition agent may be further treated before addition to Diesel fuel. For example it may be sweetened with doctor solution in the conventional manner, or treated by other reagents, such as weak alkali polysulphide solution, to remove any excess of free sulphur which may remain.

When concentrated alkali polysulphide solution is used as sulphurizing agent, the solution of ignition agent is separated from the spent polysulphide solution in a suitable separator not shown, and the latter solution may be returned to line 31 after it has been brought up to strength by the solution of sulphur therein.

The invention may be carried out using various types of apparatus, and has many modifications, one of which is illustrated by Figure 2. Although the sour distillate to be treated may be any of those previously described, this modification of the invention will be described using, as the distillate to be treated, the crude polymer from the catalytic polymerization of unsaturated gases containing hydrogen sulphide. This polymer preferably contains at least 0.3% sulphur of which 65–90% is sulphur in the form of mercaptans.

Crude polymer is withdrawn from tank 40 by means of line 41 and pump 42, and introduced into line 43, and mixed therein with an aqueous alkali solution, for example a 20% solution of caustic soda obtained from a source hereinafter described. The mixture of polymer and caustic solution is passed through mixer 44 and contact coil 45, in which the caustic solution extracts a major portion of the mercaptans from the polymer as mercaptides. The mixtures then introduced into caustic settler 46, in which the treated polymer and the now spent caustic are allowed to separate into two layers. The upper polymer layer in settler 46 is removed through line 47, heated in a conventional pipe heater 48 and passed into rerun tower 49, which is provided with a reboiler or stripping means 50 and a reflux line 51. The tower bottoms (unvaporized residue) which contains high-boiling sulphur compounds, is removed through line 52, or it may be utilized in the process in a manner hereinafter described.

The overhead from rerun tower 49, which is a relatively low-sulphur polymer fraction of the desired boiling range, hereinafter referred to as polymer gasoline, is withdrawn through line 53, condensed in condenser 54, and introduced into separator 55, from which uncondensible gases, such as hydrogen sulphide formed by decomposition of sulphur compounds during the rerunning step, are removed through vent 56. The polymer gasoline is withdrawn from separator 55 by means of line 57 and pump 58. A portion of this gasoline is passed through line 59 and combined with a stream of fresh doctor solution introduced into the system by means of a line 60 and a pump 61. Another portion of the polymer gasoline withdrawn from separator 55 by means of line 57 and pump 59 is passed through line 51 as reflux for rerun tower 49, as hereinbefore described.

The mixture of polymer gasoline and doctor solution is passed through mixer 62 and contact coil 63 to doctor settler 64, where the finished polymer gasoline and the spent doctor solution are allowed to separate into layers. The finished polymer gasoline is withdrawn through line 65 to storage, and the spent doctor solution is removed through line 66. By means of this doctor sweetening step, any volatile mercaptans which escaped removal in the caustic treating step, or which were formed by decomposition of sulphur compounds during the rerunning step are converted into unobjectionable forms, and the polymer gasoline is rendered suitable for sale.

The spent caustic from caustic settler 46 is removed by means of line 67, pump 68 and line 69 and introduced into the upper portion of blow tank 70. In blow tank 70, the spent caustic is contacted with either steam or air introduced through line 71 and a distributing device 72 located in the bottom thereof. When steam alone is used to revivify the spent caustic the solution is maintained at a temperature favoring hydrolysis of the mercaptides therein, e. g., 215–235° F. and the steam is preferably superheated sufficiently to maintain the caustic at this temperature without either increasing or decreasing the volume of solution. If desired a portion of the necessary heat may be supplied by means of heating coil 73.

The steam hydrolyzes the mercaptides in the spent caustic to sodium hydroxide and mercaptans, and the latter are volatilized and pass overhead together with steam through line 74 and condenser 75 into separator 76, from which uncondensible gases are removed through vent 77. The condensed steam and recovered mercaptans separate into two layers in separator 76, the lower layer comprising water containing dissolved mercaptans being removed by means of line 78 and pump 79, and introduced through line 80 into the upper portion of washing tower 81. Diesel fuel or similar petroleum distillate is introduced into the bottom of washing tower 81 by means of line 82, passes through the tower counter-current to the stream of aqueous solution, and dissolves the mercaptans from the water, thus rendering the latter sufficiently free from odor that it may be discarded to the sewer through line 83. The solution of mercaptans in Diesel fuel is removed from washing tower 81 through line 84 and valve 85 into line 86, valves 87 and 88 being closed.

The regenerated caustic solution is removed from blow tank 70 through line 89, valve 90 and line 91, valves 92 and 93 being closed, and is returned by means of pump 94 to line 43 for the treatment of a further quantity of crude polymer as hereinbefore described. From time to time fresh caustic solution of suitable concentration is introduced into line 43 by means of line 95 and pump 96 to maintain the concentration and quantity of caustic solution in the system.

When the spent caustic in blow tank 69 is revivified by blowing with air, sufficient steam is preferably mixed therewith to prevent undue concentration of the solution. The caustic solution is maintained at a temperature of 195–220° F. so that the mercaptides therein are oxidized principally to disulphides, which are recovered together with other sulphur compounds in separator 76. Air and other uncondensible gases are removed from the top of separator 76 by means of vent 77. Some water vapor is carried overhead together with the disulphides from blow tank 70 and condensed in condenser 75. This aqueous condensate separates as a lower layer in separator 76, and is washed with Diesel fuel as hereinbefore described.

It is preferred in this case to wash the revivified caustic solution from tank 70 with Diesel fuel in order to remove small amounts of sulphur compounds therefrom. This step is desirable because disulphides are less volatile than the corresponding mercaptans and cannot be completely carried overhead to separator 76, but is not essential because heavy disulphides contained in the revivified caustic solution will dissolve in the polymer being treated in the alkali washing stage and will be removed therefrom in the tower bottoms in rerun tower 59.

When it is desired to remove the disulphides from the revivified caustic solution, valves 85 and 90 are closed, and valves 87, 88, 92 and 93 are opened. The revivified caustic solution then flows from the bottom of blow tank 70 through line 89, valve 92, and line 97 into the top of washing tower 98, in which it is countercurrently washed with Diesel fuel from washing tower 81 introduced into the bottom of washing tower 98 by means of line 84, valve 87, and line 99. The caustic solution, now substantially free of disulphides is recycled to the alkali treating stage by means of line 100, valve 93, line 91 and pump 94. The Diesel fuel solution of disulphides and other sulphur compounds is removed from the top of washing tower 98 through line 101, valve 88, and line 86.

The Diesel fuel solution of sulphur compounds in line 86 is then mixed with the sulphur compounds concentrated in the upper layer in separator 76 by means of lines 102 and 103. The sulphur compounds present will be predominantly mercaptans or disulphides, depending on the agent used to revivify the caustic. In either case, the tower bottoms from rerun tower 49, which is rich in sulphur compounds, may be added to the solution by opening valve 104, and passing the bottoms through line 105 which joins line 103. The solution is then charged by means of pump 106 to the sulphurizing stage, which is similar to that described in connection with Figure 1. A sulphurizing agent such as sulphur, a concentrated solution of sulphur in an organic solvent or a concentrated aqueous solution of alkali polysulphide is added to the solution through line 109, and the mixture is passed through mixer 107 and reaction coil 108 to produce a concentrated solution of ignition agent which is suitable for addition to Diesel fuel in relatively small amounts to improve the ignition characteristic thereof.

Another embodiment of the invention comprises broadly the process of sulphurizing sulphur compounds such as mercaptans or disulphides at high temperatures and pressures in solution in Diesel fuel or a similar petroleum fraction by means of a concentrated solution of alkali polysulphide, washing the product with weak polysulphide solution, and sweetening with doctor solution.

One method of carrying out this embodiment of the invention is illustrated by the flow diagram shown in Figure 3. A solution of sulphur compounds in Diesel fuel, such as the unsulphurized product obtained by the process illustrated by Figure 2 when using steam for blowing the spent caustic, is introduced into the system by means of pump 120 and line 121 and passed through heater 122. This solution may contain principally disulphides, but preferably contains 5–20% of mercaptans. It is supplied to the heater at elevated pressure, e. g., 100–1000 pounds per sq. in. and is heated therein to an elevated temperature such as 250–400° F. The heated solution is then passed upward through treating towers 123, 124, 125, and 126 successively by means of lines 127, 128, 129, and 130. A concentrated aqueous solution of an alkali polysulphide such as $Na_2S_x$ obtained from a source hereinafter described is forced by means of pump 131 and line 132 through heater 133 in which it is heated to an elevated temperature, and then passes successively down treating towers 126, 125, 124, and 123 by means of lines 134, 135, 136, and 137. It will thus be seen that the solution of sulphur compounds in Diesel fuel is subjected to countercurrent contacting with increasing concentrations of polysulphide solution at elevated temperatures and pressures, thus sulphurizing the dissolved sulphur compounds to produce compounds having ignition accelerating characteristics. Although four treating stages are shown, more or fewer stages may be used. If desired crude sulphur compounds such as mercaptans from any suitable source may be introduced into the second treating stage of the system by means of pump 138 and line 139 connected to line 128, through valve 140, which at other times is normally closed.

The sulphurized solution is withdrawn from the top of tower 128 through line 141 and passed through cooler 142 and up through treating towers 143 and 144 in series by means of lines 145 and 146. The polysulphide solution is removed from the bottom of tower 123 by means of line 147, cooled in cooler 148, and circulated down towers 144 and 143 in series by means of pump 149, and lines 150 and 151. It will thus be seen that the solution of sulphurized compounds in Diesel fuel, which now contains free sulphur due to decomposition of the polysulphide solution at an elevated temperature, is countercurrently washed with a polysulphide solution which is relatively weak, i. e., low in sulphur, which dissolves free sulphur from the oil solution. The weak polysulphide solution from the bottom of tower 143 is introduced by means of line 152 into a sulphur dissolving drum 153, in which its sulphur content is brought up to the required strength, and the resulting strong solution is withdrawn by pump 131 through line 154 and recirculated through the system. The supply of sulphur in drum 153 is replenished from time to time by the addition of sulphur through hopper 153a. Additional alkali sulphide or polysulphide solution may also be introduced into drum 153 by suitable means (not shown) in order to maintain the necessary volume of polysulphide solution in the system.

The solution of sulphurized compounds in Diesel fuel is withdrawn from the top of tower 144 by means of line 155 and introduced into the bottom of sweetening tower 156 in which it is treated with doctor solution supplied from a suitable source by means of line 157. The spent doctor is withdrawn through line 158. The final product, which is removed through line 159, is a sweet concentrated solution of Diesel fuel ignition agent in Diesel fuel.

While certain specific embodiments of the invention have been described in detail, we do not limit ourselves thereto except as defined by the following claims which should be construed as broadly as the prior art will permit.

We claim:

1. The process of preparing a solution consisting mostly of alkyl polysulphides dissolved in a hydrocarbon solvent, said solution being adapted for use as a Diesel fuel ignition agent, comprising dissolving an aliphatic sulphur compound having not more than two sulphur atoms per molecule in said hydrocarbon solvent, sulphurizing the resulting solution at an elevated temperature and pressure in the presence of a concentrated aqueous solution of an alkali polysulphide, and washing the sulphurized solution with a relatively weak aqueous solution of an alkali polysulphide.

2. The process of claim 1 wherein said aliphatic sulphur compound is an aliphatic mercaptan.

3. The process of claim 1 wherein said aliphatic sulphur compound is an aliphatic disulphide.

4. The process of claim 1 wherein said elevated temperature is in the range from about 250° F. to about 400° F. and said elevated pressure is in the range from about 100 to about 1000 pounds per square inch.

5. The process of preparing a solution consisting mostly of alkyl polysulphides dissolved in a hydrocarbon solvent, said solution being adapted for use as a Diesel fuel ignition agent, comprising dissolving an aliphatic sulphur compound having not more than two sulphur atoms per molecule in said hydrocarbon solvent, countercurrently treating the resulting solution with a concentrated aqueous solution of an alkali polysulphide at an elevated temperature and pressure in a sulphurizing zone, removing the sulphurized solution from said sulphurizing zone, removing weak alkali polysulphide solution from said sulphurizing zone, washing said sulphurized solution with said weak alkali polysulphide solution, removing sulphurized solution and weak alkali polysulphide solution from said washing zone, dissolving sulphur in said last-mentioned polysulphide solution to increase the sulphur content thereof, and recycling the sulphur-enriched alkali polysulphide solution to said sulphurizing zone.

CLARENCE H. SEELEY.
MAURICE H. ARVESON.